Sept. 18, 1962 D. E. DAVIDSON 3,054,323
AUTOMATIC OPTICAL MEASURING INSTRUMENT
Filed Jan. 5, 1959 2 Sheets-Sheet 2

INVENTOR.
DONALD E. DAVIDSON
BY Forrest J. Lilly
Attorney

United States Patent Office 3,054,323
Patented Sept. 18, 1962

3,054,323
AUTOMATIC OPTICAL MEASURING
INSTRUMENT
Donald E. Davidson, La Habra, Calif., assignor to Davidson Optronics Inc., West Covina, Calif., a corporation of California
Filed Jan. 5, 1959, Ser. No. 784,988
6 Claims. (Cl. 88—14)

This invention relates to optical instruments, and more particularly to an optical instrument for measuring the angular deviation between two optical paths.

This application is a continuation-in-part of my copending application, S.N. 701,418, filed December 9, 1957, now abandoned, and entitled Autocollimator and Automatic Control Means Therefor.

A typical application of the present instrument is determining the angle of and/or aligning a distant mirror situated on the optic axis of the instrument. Assume, for the moment, that the mirror is exactly normal to the axis and that light rays are transmitted from the instrument toward the mirror. When the mirror is in this position, those light rays which travel to the mirror in a given plane parallel to the axis are reflected back toward the instrument in that plane.

Assume now that the mirror is rotated slightly about an axis normal to the optic axis and parallel to the given plane. Those light rays which now travel from the instrument to the mirror in the given plane are reflected back toward the instrument in a second plane which deviates from the given plane in the direction of rotation of the mirror and by an angle which is equal to twice the angle of rotation of the mirror. Light rays which travel to the mirror in the second plane, of course, are reflected back toward the instrument in the given plane.

Let a plane of measurement normal to the optic axis now be established. The distance between the given plane and the intersection of the second plane with the plane of measurement, measured in the latter plane normal to the given plane, is a function of the angle of deviation of the second plane and the distance from the plane of measurement to the mirror. If we assume the latter distance to be known, the distance between the given plane and the intersection of the second plane becomes a direct function of the angle of deviation. In other words, the angle of the distant mirror can be determined from a measurement of the latter distance either by computation or by the use of a suitably calibrated measuring means. The present instrument is so arranged and constructed that this distance measurement, and hence the angular measurement of mirror rotation, may be accomplished both by visual observation and electronic detection as well as continuously by automatic operation of the instrument. The angular measurement obtained, of course, can be used to subsequently correct the misalignment of the mirror.

In the use just mentioned, the quantity which is measured by the instrument is, in reality, the angular deviation produced in an optical path by a reflector. It will become readily apparent as the description proceeds that the instrument can, as well, be used to measure deviations produced in optical paths by other optical devices, such as a refractor. The invention, therefore, should not be thought of as limited to use in aligning distant mirrors as described herein for illustrative purposes.

With the foregoing preliminary discussion in mind, a broad object of the invention may be stated as being the provision of a new and improved optical instrument of the character described for making precision measurements of angular deviations produced in optical paths by optical devices.

A more specific object of the invention is to provide an optical measuring instrument of the character described in which optical measurements may be accomplished both by visual observation and electronic detection.

Another object of the invention is to provide an optical measuring instrument of the character described which is capable of continuous automatic operation.

Yet another object of the invention is to provide an optical measuring instrument of the character described which has a relatively wide field of view so as to be uniquely suited to aligning distant mirrors.

Other objects and advantages of the invention will become evident as the description proceeds.

Briefly, the objects of the invention are attained by providing an optical instrument equipped with a light transmitter, an objective lens to receive light rays from the light transmitter, and a light receiver located along the optic axis and at an image plane of the lens to receive light rays passing through the lens from the light transmitter. Included in the light transmitter are linear reference means which are disposed in the plane of measurement and are movable along direction lines in the plane transverse to the reference means. Also included in the transmitter are two light sources which extend parallel to said direction lines, one of which is exposed at one side of said reference means and the other of which is exposed at the other side of said reference means. The reference means are movable across a plane normal to the direction lines and containing the optic axis and through a position in which the reference means are centered with respect to the latter plane. This latter plane is referred to hereinafter as the optic plane and the latter position is referred to as the normal position of the reference means.

In the illustrated embodiment of the invention, the two light sources of the light transmitter comprise parallel fluorescent tubes which extend parallel to said direction lines and are disposed in overlapping fashion, and the reference means comprise the end edges of two opaque, movable shutters which are located approximately in said plane of measurement and extend along the tubes, respectively. The shutter edges are approximately aligned and parallel the optic plane, and the shutters extend in opposite directions from the edges so that the overlapping ends of the tubes are exposed at opposite sides of the shutter edges, respectively.

In the typical use discussed earlier, the instrument is set up in such a way that light rays travel from the light transmitter to the mirror, which is situated on the optic axis of the objective lens, and are then reflected back toward the lens. The lens is focused to produce an image of the reference means in the image plane at the light receiver. This image is subsequently referred to as the reference image.

If the mirror is exactly normal to the optic axis of the lens and the reference means are laterally displaced from their normal, centered position with respect to the optic plane, light rays from one light source of the transmitter travel to the mirror in the optic plane and are reflected back in this plane through the lens to the image plane. If the reference means are shifted to their normal position, those light rays which emanate from along the sides of the reference means parallel to the optic plane and define the reference image are reflected back parallel to the optic plane so that the reference image arrives at the image plane in a centered position with respect to the optic plane. This is the normal position of the reference image. Light rays from one light source arrive at the image plane at one side of the reference image and light rays from the other light source arrive at the image plane at the opposite side of the reference image.

Let the mirror now be rotated slightly about an axis normal to the optic axis and parallel to the optic plane.

Those light rays which emanate from along the sides of the reference means parallel to the optic plane are now reflected back parallel to a second plane which deviates from the optic plane by an angle which is twice the angle of rotation of the mirror. The reference image, therefore, arrives at the image plane in a position laterally displaced from its normal position. Light rays from one of the light sources, depending on the direction of rotation of the mirror, now travel to the mirror in the second plane and are reflected back in the optic plane to the image plane.

As explained earlier, the distance between the optic plane and the intersection of the second plane with the plane of measurement containing the reference means is a function of the angle of rotation of the mirror. In the present instrument, this distance is determined by moving the reference means to a position in which the reference image is returned to its normal position. In this latter position of the reference means, of course, the reference means are centered with respect to the intersection of the second plane with the plane of measurement so that light rays which emanate from along the sides of the reference means parallel to the second plane are reflected back parallel to the optic plane and produce a reference image which is centered with respect to the optic plane. The distance through which the reference means must be moved from their normal position is equal to the distance between the optic plane and the intersection of the second plane and, therefore, a function of the angle of rotation of the mirror. This distance of movement is indicated by a distance measuring device so that the rotation angle can be obtained by computation or by suitable calibration of the distance measuring device.

One of the features of the instrument resides in the fact that the position of the reference image can be visually observed and the reference means can be moved manually to permit manual operation of the instrument. A second feature of the invention resides in the fact that the two light sources of the light transmitter emit fluctuating light of two different phases. The light receiver includes a phase-responsive photoelectric means having a narrow photosensitive zone in the image plane aligned with the optic plane and a meter for indicating the phase of light on said zone to permit electronic sensing of the position of the reference image during manual operation of the instrument.

A third feature of prime importance resides in the fact that the reference means are driven by a reversible servomotor controlled by the phase-responsive photoelectric means to permit continuous automatic operation of the instrument during which the measuring device continuously furnishes a reading indicative of the current angle of the distant mirror.

A better understanding of the invention may be had from the following detailed description of an illustrative embodiment wherein reference is had to the attached drawings, in which:

FIG. 1 diagrammatically illustrates the optical measuring instrument;

Figure 1:
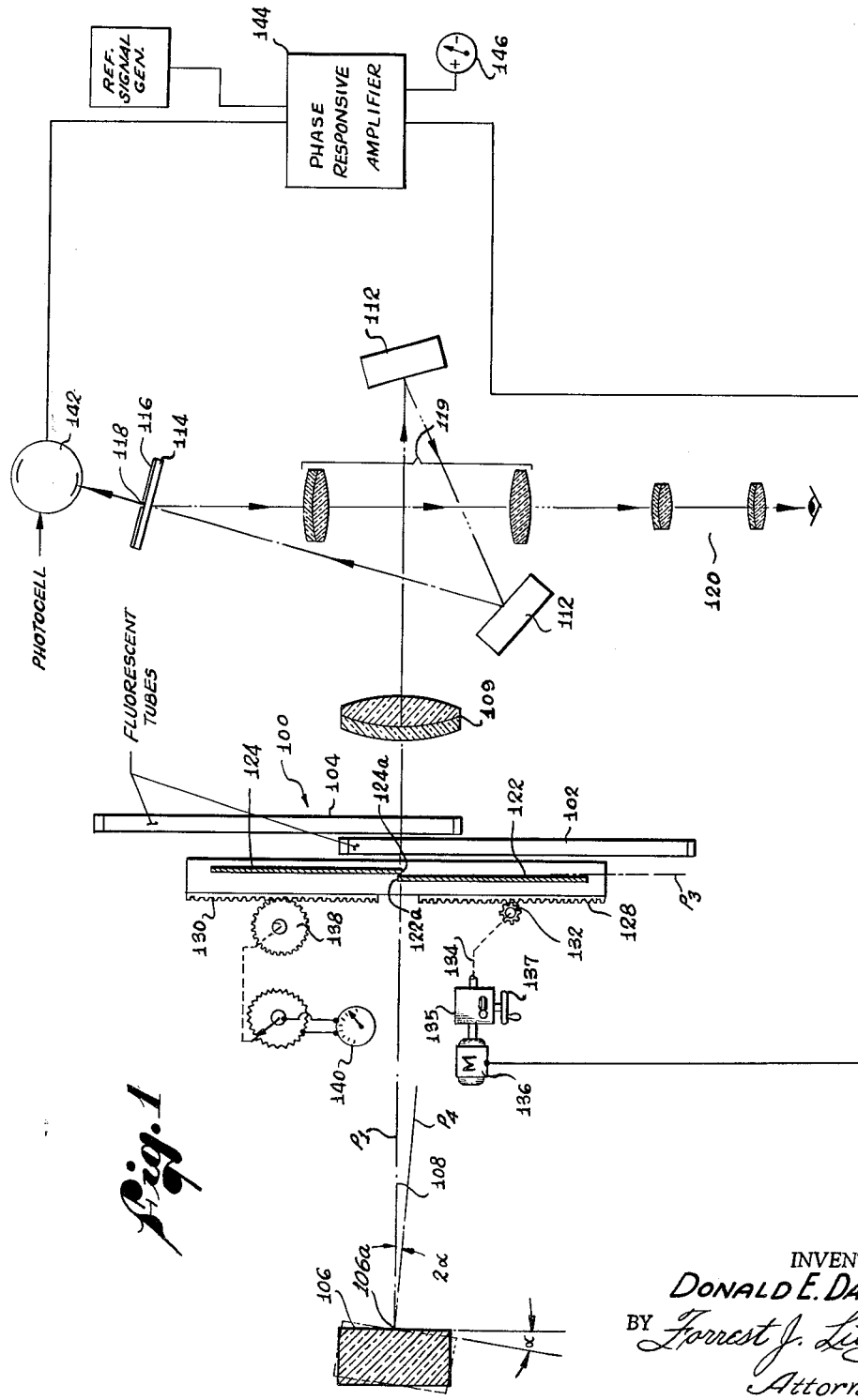
Figure 2:
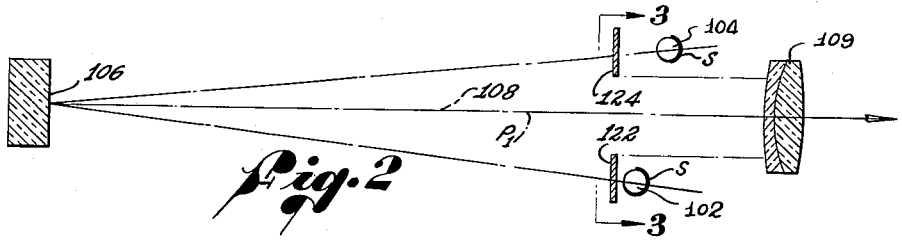
FIG. 2 is a side elevational view of certain components embodied in an instrument of FIG. 1.
Figure 3:
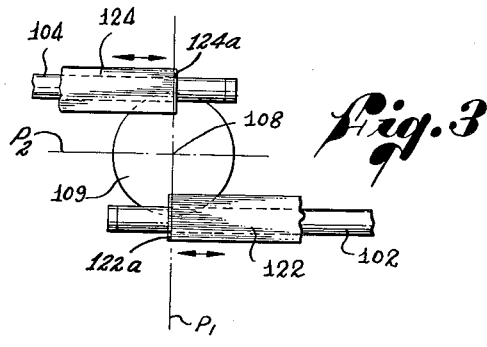
FIG. 3 is a view looking in the direction indicated by the arrows in line 3—3 of FIG. 2.

Referring now to these drawings, the optical measuring instrument will be seen to comprise a light transmitter 100 consisting of a pair of fluorescent tubes or lamps 102 and 104. Lamps 102 and 104 are disposed in parallel, overlapping fashion, as shown in FIGS. 1, 2 and 3, and energized 180° out of phase. Lamp 102 is assumed to have a "plus" phase and lamp 104 a "minus" phase.

As preliminarily mentioned, the invention will be described with reference to one of its typical uses, namely, aligning a distant mirror 106 situated on the optic axis 108 of the objective lens 109 of the instrument. Lamps 102 and 104 extend normal to and to opposite sides of a plane $P_1$ containing the optic axis 108. This is the "optic plane" referred to earlier. The lamps are located at opposite sides of a plane $P_2$ normal to the plane $P_1$ and containing the optic axis 108. Finally, the lamps are located proximate to a plane $P_3$ normal to the optic axis 108, which plane is the "plane of measurement" referred to earlier.

Objective lens 109 of the instrument is focused for a distance approximately equal to the distance from the lens 109 to mirror 106, plus the distance from the mirror to the plane of measurement $P_3$. The sides of the lamps facing away from the mirror 106 are silvered, as indicated at S, so that light rays travel only from the lamps toward the mirror.

Those light rays from the lamps 102 and 104 which are reflected by the mirror 106 to the objective lens pass through the lens and are then reflected by mirrors 112 to an optical plate 114. The back of this plate is silvered or otherwise provided with a suitable reflective film 116 which forms an image surface. This film has a reference line comprising a narrow exit slit 118 located in the optic plane $P_1$.

Image surface 116 is located in an image plane of the lens 109. Since the lamps 102 and 104 are located proximate to the plane $P_3$ at which the lens 109 is focused, light rays from lamps 102 and 104 are approximately focused on the image surface 116 to produce on the latter images of the portions of the lamps exposed to the lens. These images, indicated at 102a and 104a in FIGS. 4 through 7, are reflected through an erecting lens system 119 to an eyepiece 120.

Located in front of the lamps 102 and 104, that is, between the lamps and the mirror 106, are two opaque shutters 122 and 124. These shutters extend lengthwise of the lamps and are longitudinally offset so that they expose the overlapping ends of the lamps and obscure most of the remaining portions of the lamps, as shown. The shutters, which are fixed to a movable carriage 126, for simultaneous movement lengthwise of the lamps 102 and 104, have their adjacent end edges 122a and 124a located approximately in a common plane parallel to the optic plane $P_2$. Actually, the adjacent ends of the shutters just slightly overlap, as may be seen most clearly in FIG. 3. These shutter edges serve as reference edges and form the "reference means" referred to earlier. Objective lens 109 produces images 122a' and 124a' of these reference edges in the image plane and on the image surface 116. These images are referred to hereinafter as a reference image I.

Carriage 126 mounts a pair of racks 128 and 130. Rack 128 meshes with a pinion 132, fixed to a shaft 134. This shaft is arranged to be selectively coupled, by shifting a suitable clutching device 135, to a reversible servomotor 136 or to a handwheel 137 for moving the carriage 130, and hence the shutters 122 and 124 thereon, in opposite directions along the illustrated direction lines in the plane of measurement $P_3$ and normal to the shutter edges 122a, 124a.

The other carriage rack 130 meshes with a pinion 138 which is coupled to an electrical read-out device or indicator 140. This read-out device is calibrated to indicate the displacement of the shutter edges 122a and 124a from the optic plane $P_1$.

Located behind the exit slit 118, so as to receive light from the lamps 102 and 104 passing through the slit, is a photocell 142, preferably a photomultiplier tube. The output of this tube is connected to a phase responsive amplifier 144, the output of which, in turn, is connected to the servomotor 136. Amplifier 144 may comprise any conventional phase responsive circuitry for generating one error signal to cause driving of motor 136 in one direction in response to light of plus phase from lamp 102 passing through the exit slit 118 to the photocell 142 and generating another error signal to cause driving of motor 136 in the opposite direction in response to the light of minus phase from lamp 104 passing through the exit slit to the photocell. These error signals may also be fed to a suitable indicating motor 146 for visually indicating the phase of the light incident on the photocell.

Figure 4:
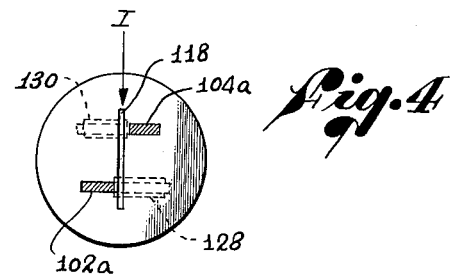
FIGS. 4 through 7 are views through the eyepiece of the instrument of FIG. 1 under certain different conditions of operation.

Operation of the instrument is as follows. If the mirror 106 is exactly perpendicular to the axis 108 and the shutters 122 and 124 are in their normal position of FIG. 3, wherein the reference edges or reference means 122a, 124a are centered with respect to the optic plane $P_1$, it will be seen that light rays emitted from the lamps along the edges 122a and 124a parallel to the optic plane $P_1$ are reflected back by the mirror parallel to the optic plane and through the objective lens 109. In this case, the reference image I arrives at the image plane in its centered or normal position with respect to the optic plane $P_1$. Accordingly, the reference image is centered on the exit slit 118 and appears as shown in FIG. 4 when viewed through the eyepiece 120. Light rays from lamp 102 arrive at the image surface 116 at one side of the reference image I to produce the light image 102a. Light rays from the other lamp 104 arrive at the image plane at the opposite side of the reference image to produce light image 104a. The spacing between the reference edge images 122a' and 124a', which make up the reference image I, has been exaggerated for clarity in the drawing. This spacing should be approximately the same or just very slightly greater than the width of the exit slit 118. The phantom lines in FIG. 4, as well as in FIGS. 5 through 7, indicate the positions of the shutters 122 and 124, and the portions of the lamps 102 and 104 obscured thereby. Actually, of course, the shutters, except for their edges 122a and 124a, and the obscured portions of the lamps are not imaged on the surface 116.

Under the conditions shown in FIG. 4, no light passes through the exit slit to the photocell 142. Motor 136, therefore, remains inoperative.

Assume now that the mirror is rotated slightly on an axis 106a normal to the optic axis 108 and parallel to the optic plane $P_1$, as indicated in phantom lines in FIG. 1, while the shutters 122 and 124 remain in their normal position of FIG. 3. In this case, it will be evident that the light rays emitted from the lamps 102 and 104 along the reference edges or reference means 122a and 124a of the shutters parallel to the optic plane $P_1$ are reflected from the mirror back toward the objective lens 109 parallel to a plane $P_4$ which deviates from the optic plane by an angle 2α, wherein α is the angle of rotation of the mirror.

Figure 5:
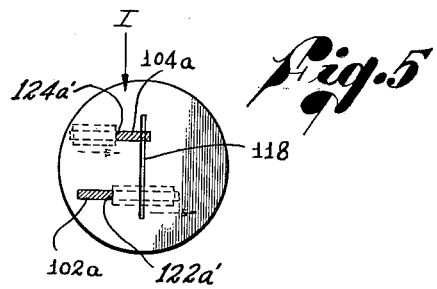

With the mirror thus misaligned, the reference image I is laterally displaced from its normal position with respect to the optic plane $P_1$ and the exit slit 118, as illustrated in FIG. 5. The direction in which the reference image is displaced, of course, depends on the direction in which the mirror 106 is rotated from its aligned position.

The angle α, that is, the angle of misalignment of the mirror 106, is determined by shifting the shutters 122 and 124 longitudinally of the lamps to a position wherein the reference image I is returned to its normal position of FIG. 4. Thus, with the mirror misaligned in the direction indicated in FIG. 1, the shutters 122 and 124 are shifted downwardly, as the instrument is viewed in FIG. 1, or to the right, as the instrument is viewed in FIG. 3. When the shutters reach a position in which the reference edges or reference means 122a, 124a are centered with respect to the intersection of the plane $P_4$ with the plane of measurement $P_3$, light rays emitted from the lamps 102, 104 along the edges parallel to the plane $P_3$ are reflected back parallel to the optic plane $P_1$ and the reference image I will again occupy its normal position on the exit slit 118. The distance through which the reference edges or reference means 122a, 124a move from their normal position to the position in which the reference means are centered with respect to the intersection of the plane $P_3$ with the plane of measurement and the reference image I is returned to its normal position on the exit slit 118 is related to the angle of rotation α of the mirror 106 according to the equation:

$$A = B \tan 2\alpha,$$

where A is the distance through which the reference means 122a, 124a move from their normal position and B is the distance from the plane of measurement $P_3$ to the mirror 106, measured parallel to the optic axis 108. Where the latter distance is great and the angle 2α is small, the following equation holds true with a negligible error:

$$A = B \sin 2\alpha.$$

The distance B can, of course, be measured while the distance A of movement of the reference means 122a, 124a can be read from the read-out device 140. This latter reading can then be converted to the angle α of misalignment of the mirror. In the alternative, of course, the read out device may be calibrated directly in terms of the angle α so as to permit the angle of misalignment of the mirror to be read directly. If the mirror is misaligned in the other direction, the angle of misalignment of the mirror may be determined by appropriately shifting the shutters 122 and 124 in the opposite direction.

This movement of the shutters is accomplished automatically in the illustrated instrument as follows. Assume that the mirror is rotated out of alignment while the shutters remain in their normal position so that the reference image I is laterally displaced from the exit slit 118 as shown in FIG. 5. One lamp image, therefore, falls on the exit slit, namely image 104a, as illustrated in FIG. 5.

Under these conditions, only light rays of minus phase from lamp 104 passes through the slit 118 and impinge photocell 142 therebehind. Amplifier 144 is so polarized that under these conditions, the motor 136 is energized to drive the shutters 122 and 124 downwardly, as viewed in FIG. 1 or to the right, as viewed in FIG. 3. Movement of the shutters in this direction returns the reference image I toward its normal position on the exit slit 118.

Figure 6:

Driving of the motor 136 in this direction continues until the condition of FIG. 6 is reached. Lamp image 102A now overlies the exit slit 118 so that only light rays of plus phase from lamp 102 passes through the exit slit to the photocell.

Amplifier 144 responds to the change in phase of the light incident on the photocell, which occurs as the reference image I moves across the slit 118, by reversing the motor 136. The motor now drives in a direction to move the shutters 122 and 124 toward the left, as viewed in FIG. 3.

Figure 7:
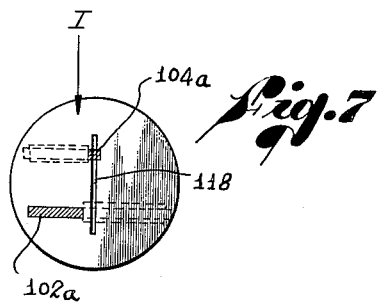

Driving of the motor in this direction continues until the reference image I again moves to the left of the exit slit 118, as shown in FIG. 7. Lamp image 104a now again falls on the slit 118 so that light from lamp 104 impinges the photocell. The direction of the motor 136 is now reversed and the cycle is repeated.

The shutters 122 and 124 are, therefore, caused to continuously hunt about a null position related in the manner already mentioned to the angle of misalignment of the mirror. This null position, and hence the misalignment of the mirror, may be determined from the electric read out device 140.

It will be apparent from the foregoing description that the instrument may also be operated manually by the hand wheel 137. In this case, the positions of the reference image I may be visually observed through the eyepiece 120 or determined from the indicator 146, or both. In manual operation, using the indicator 146, for example, the shutters would be moved in one direction until the indicator indicates a change in phase of incident light on the photocell. The shutters would then be moved in the opposite direction until a change in phase of incident light is again indicated.

Because of the extreme narrow width of the exit slit 118, which is on the order of .004", and the fact that the spacing between the reference edge images 122a', 124a' is approximately the same as the width of the slit, only extreme slight movement of the shutters is required to shift the reference image from one side of the slit to the other, which shifting is evidenced in the change in the phase of incident light on the photocell. Accordingly, the hunting movement of the shutters during automatic operation of the instrument and the "hunting" movement which must be imparted to the shutters during manual operation of the instrument are extremely small so that the instrument possesses a high degree of accuracy. Moreover, the instrument is extremely sensitive owing to abrupt change which occurs in the characteristic of light to which the instrument responds, namely, its phase, when the reference image moves from one side of the slit to the other. This abrupt change would not be obtained if the system were sensitive to a change in incident light intensity, as is the case in some photoelectric control systems. These latter systems have other deficiencies which are noted in my copending application.

Owing to the extension of the lamps 102 and 104 in the plane of measurement P$_3$, the field of view of the instrument is relatively wide as compared with an autocollimator, for example. Accordingly, the mirror whose alignment is to be determined need not be initially aligned with the same high degree of accuracy required in existing autocollimators. This feature of the instrument is, obviously, highly advantageous especially when aligning distant mirrors and uniquely adapts the present instrument to that purpose.

A possible alternative, where the instrument is to be manually operated by visual observation, is the replacement of the illustrated pair of lamps by a single long lamp and the replacement of the shutters by a linear reference element such as a cross hair which is adjustable along the lamp to align its image with the reference line 118.

It will be apparent also that in the illustrated instrument the reference edges or means 122a, 124a could be stationarily centered with respect to the lamps, and the latter and the reference means shifted as a unit in lieu of shifting the masks in front of the lamps, as described.

Figure 8:
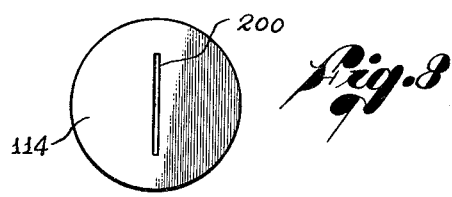
FIG. 8 illustrates a modification to the instrument of FIGS. 1–7.

From the foregoing description of the instrument, it is evident that the illustrated slit and photocell arrangement forms, in effect, a photoelectric receiver having a narrow light sensitive zone. Obviously, this same result could be achieved in other ways, such as by replacing the slit and tube with a narrow photosensitive strip 200, secured to the reflecting plate 114 in the same position as the slit 118, as shown in FIG. 8.

Numerous other modifications in design, arrangement of parts and instrumentalities of the invention are possible within the scope of the following claims.

I claim:

1. An optical instrument for angularly aligning a distant optical reflector, comprising:
   an objective lens having an optic axis on which said reflector is adapted to be located,
   said reflector being adapted to be aligned by rotation of the reflector on an axis normal to said optic axis and parallel to the reflecting surface of the reflector and to an optic plane containing said optic axis,
   two long, approximately parallel light sources extending substantially normal to and across said optic plane,
   said light sources being energized out of phase and located at opposite sides of a plane normal to said optic plane and containing said axis,
   a shutter positioned opposite and extending lengthwise of each light source between the latter and the reflector and in a plane of measurement approximately normal to said axis and proximate to the light sources,
   said shutters having adjacent end edges,
   one shutter extending one lengthwise direction of the light sources from said edges and the other shutter extending in the opposite lengthwise direction of the light sources from said edges, whereby one end portion of one light source is exposed to said reflector beyond the edge of the shutter opposite the latter source and the opposite end portion of the other light source is exposed to said reflector beyond the edge of the shutter opposite the latter source,
   means for moving said shutters in unison in said plane of measurement lengthwise of said light sources,
   said shutters being movable through a position in which said edges are centered with respect to said optic plane,
   means for indicating the displacement of said shutters from said position,
   said lens being focused to produce an optical image of said edges in an image plane of said lens substantially normal to said axis,
   a photosensitive means having a narrow photosensitive zone in said image plane along the intersection of the latter plane with said optic plane, and
   phase-responsive means coupled to the output of said photosensitive means to sense the phase of light incident on said zone.

2. An optical instrument for angularly aligning a distant optical reflector, comprising:
   an objective lens having an optic axis on which said reflector is adapted to be located,
   said reflector being adapted to be aligned by rotation of the reflector on an axis normal to said optic axis and parallel to the reflecting surface of the reflector and to an optic plane containing said optic axis,
   two long, approximately parallel light sources extending substantially normal to and across said optic plane,
   said light sources being energized out of phase and located at opposite sides of a plane normal to said optic plane and containing said axis,
   a shutter positioned opposite and extending lengthwise of each light source between the latter and the reflector and substantially in a plane of measurement approximately normal to said axis and proximate to the light sources,
   said shutters having adjacent end edges,
   one shutter extending in one lengthwise direction of the light sources from said edges and the other shutter extending in the opposite lengthwise direction of the light sources from said edges, whereby one end portion of one light source is exposed to said reflector beyond the edge of the shutter opposite the latter source and the opposite end portion of the other light source is exposed to said reflector beyond the edge of the shutter opposite the latter source.
   means for moving said shutters in unison in said plane of measurement lengthwise of said light sources,
   said shutters being movable through a position in which said edges are centered with respect to said optic plane,
   means for indicating the displacement of said shutters from said position,
   said lens being focused to produce an optical image of said edges in an image plane of said lens substantially normal to said axis,
   means providing a surface in said image plane to receive said image,
   photosensitive means having a narrow photosensitive zone along the intersection of said optic plane with said surface, phase-responsive means coupled to the output of said photosensitive means for sensing the phase of light incident on said zone, and an eyepiece focused on said surface for viewing said image and zone.

3. An optical instrument for angularly aligning a distant optical reflector comprising:

an objective lens having an optic axis on which said reflector is adapted to be located, said reflector being adapted to be aligned by rotation of the mirror on an axis normal to said optic axis and parallel to the reflecting surface of the reflector and to an optic plane containing said optic axis, two long, approximately parallel light sources extending substantially normal to and across said optic plane, said light sources being energized out of phase and located at opposite sides of a plane normal to said optic plane and containing said optic axis, a shutter positioned opposite and extending lengthwise of each light source between the latter and the reflector and substantially in a plane of measurement approximately normal to said axis and proximate to the light sources, said shutters having adjacent end edges, one shutter extending in one lengthwise direction of the light sources from said edges and the other shutter extending in the opposite lengthwise direction of the light sources from said edges, whereby one end portion of one light source is exposed to said reflector beyond the edge of the shutter positioned opposite the latter light source and the opposite end portion of the other light source is exposed to the reflector beyond the edge of the shutter positioned opposite the latter light source, means including a reversible servomotor for moving said shutters in unison in said plane of measurement lengthwise of said light sources, said shutters being movable through a position in which said edges are centered with respect to said optic plane, means for indicating the displacement of said shutters from said position, and said lens being focused to produce an optical image of said edges in an image plane of said lens approximately normal to said optic axis, photosensitive means having a narrow photosensitive zone in said image plane along the intersection of the latter plane with said optic plane, and phase-responsive means coupled to the output of said photosensitive means and to said motor for sensing, and operating said motor in response to the phase of light incident on said zone.

4. An optical instrument for aligning a distant optical reflector comprising:

an objective lens having an optic axis on which said reflector is adapted to be located, said reflector being adapted to be aligned by rotation of the reflector on an axis normal to said optic axis and parallel to the reflecting surface of the reflector and to an optic plane containing said optic axis, two long, approximately parallel light sources extending substantially normal to and across said optic plane, said light sources being located at opposite sides of a plane normal to said optic plane and containing said optic axis, a shutter positioned opposite and extending lengthwise of each light source between the latter and said reflector and substantially in a plane of measurement approximately normal to said optic axis, said shutters having adjacent end edges, one shutter extending in one lengthwise direction of the light sources from said edges and the other shutter extending in the opposite lengthwise direction of the light sources from said edges, whereby one end portion of one light source is exposed to said reflector beyond the edge of the shutter opposite the latter light source and the opposite end portion of the other light source is exposed to said reflector beyond the edge of the shutter positioned opposite the latter light source, means for moving said shutters in unison in said plane of measurement lengthwise of said light sources, said shutters being movable through a position in which said edges are centered with respect to said optic plane, means for indicating the displacement of said shutters from said position, said lens being focused to produce an optical image of said edges in an image plane of said lens approximately normal to said optic axis, a reference means in said image plane along the intersection of the latter plane with said optic plane, and means to permit visual observation of said image and reference means.

5. An optical instrument for aligning a distant optical reflector, comprising:

an objective lens having an optic axis on which said reflector is adapted to be positioned, a light transmitter including a pair of out-of-phase light sources, means located between said sources and said reflector in a plane of measurement approximately normal to said axis including reference means approximately parallel to an optic plane containing said axis for exposing one source to said reflector at one side of said reference means and exposing the other source to said reflector at the other side of said reference means, and said first-mentioned means being movable along direction lines in said plane of measurement normal to said optic plane through a position in which said reference means are centered with respect to said optic plane, means for moving said first-mentioned means, means for indicating the displacement of said first-mentioned means from said position, said reflector being adapted to be angularly positioned to reflect light rays from said sources through said lens and said lens being focused to produce an optical image of said reference means in an image plane approximately normal to said axis, a photosensitive means having a narrow photosensitive zone in said image plane along the intersection of the latter plane with said optic plane, and phase-responsive means coupled to the output of said photosensitive means to sense the phase of light incident on said zone.

6. An optical instrument for aligning a distant optical reflector, comprising:

an objective lens having an optic axis on which said reflector is adapted to be positioned, a light transmitter including a pair of out-of-phase light sources, means located between said sources and said reflector in a plane of measurement approximately normal to said axis including reference means approximately parallel to an optic plane containing said axis for exposing one source to said reflector at one side of said reference means and exposing the other source to said reflector at the other side of said reference means, and said first-mentioned means being movable along direction lines in said plane of measurement normal to said optic plane through a position in which said reference means are centered with respect to said optic plane, means including a reversible servomotor for moving said first-mentioned means, means for indicating the displacement of said first-mentioned means from said position, said reflector being adapted to be angularly positioned to reflect light rays from said sources through said lens and said lens being focused to produce an optical image of said reference means in an image plane approximately normal to said axis, a photosensitive means having a narrow photosensitive zone in said image plane along the intersection of the latter plane with said optic plane, and phase-responsive means coupled to the output of said photosensitive means and to said motor for operating said motor in response to the phase of light incident on said zone.

References Cited in the file of this patent

UNITED STATES PATENTS

| | | |
|---|---|---|
| 2,065,421 | Bernarde | Dec. 22, 1936 |
| 2,462,925 | Varian | Mar. 1, 1949 |
| 2,837,959 | Saunderson et al. | June 10, 1958 |
| 2,870,671 | Falconi | Jan. 27, 1959 |